United States Patent
Kurabayashi

(10) Patent No.: US 10,675,538 B2
(45) Date of Patent: Jun. 9, 2020

(54) PROGRAM, ELECTRONIC DEVICE, SYSTEM, AND METHOD FOR DETERMINING RESOURCE ALLOCATION FOR EXECUTING RENDERING WHILE PREDICTING PLAYER'S INTENT

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 124 days.

(21) Appl. No.: 15/925,344

(22) Filed: Mar. 19, 2018

(65) Prior Publication Data

US 2018/0207531 A1    Jul. 26, 2018

Related U.S. Application Data

(63) Continuation of application No. PCT/JP2016/074770, filed on Aug. 25, 2016.

(30) Foreign Application Priority Data

Sep. 17, 2015   (JP) ................................ 2015-184243

(51) Int. Cl.
*A63F 13/52*      (2014.01)
*A63F 13/55*      (2014.01)
(Continued)

(52) U.S. Cl.
CPC .......... *A63F 13/52* (2014.09); *A63F 13/2145* (2014.09); *A63F 13/30* (2014.09);
(Continued)

(58) Field of Classification Search
CPC ........... A63F 13/52; A63F 13/55; A63F 13/67
See application file for complete search history.

(56) References Cited

U.S. PATENT DOCUMENTS

| 5,764,232 | A | * | 6/1998 | Oouchi | .................. | A63F 13/10 |
| | | | | | | 345/419 |
| 9,613,461 | B2 | | 4/2017 | Hanai et al. | | |

(Continued)

FOREIGN PATENT DOCUMENTS

| JP | H08-137380 A | 5/1996 |
| JP | 2005-204949 A | 8/2005 |
| WO | 2014/091824 A1 | 6/2014 |

OTHER PUBLICATIONS

International Search Report issued in Application No. PCT/JP2016/074770, dated Nov. 22, 2016 (5 pages).

(Continued)

*Primary Examiner* — Chase E Leichliter
(74) *Attorney, Agent, or Firm* — Osha Liang LLP

(57) ABSTRACT

The present invention provides a program that causes an electronic device including a display unit and a processing unit to execute selecting, as candidate objects, objects related to game events from among objects to be rendered on the display unit; determining attention scores representing the degrees of attention that will be paid by a player to the individual selected candidate objects by determining weights relating to the occurrence of individual candidate events, which are events related to the candidate objects, on the basis of the candidate objects, an event or a sequence of events that occurred immediately before, and event history information; and determining resource allocation in the processing unit for rendering the individual candidate objects on the basis of the attention scores and depth distances of the candidate objects as viewed from the player.

9 Claims, 13 Drawing Sheets

(51) Int. Cl.
  *A63F 13/30*      (2014.01)
  *A63F 13/67*      (2014.01)
  *A63F 13/2145*    (2014.01)
  *G06T 15/00*      (2011.01)
  *A63F 13/35*      (2014.01)
  *G06F 9/50*       (2006.01)

(52) U.S. Cl.
  CPC .............. *A63F 13/35* (2014.09); *A63F 13/55* (2014.09); *A63F 13/67* (2014.09); *G06F 9/5027* (2013.01); *G06T 15/00* (2013.01); *A63F 2300/61* (2013.01); *A63F 2300/64* (2013.01)

(56) References Cited

U.S. PATENT DOCUMENTS

2015/0279105 A1    10/2015  Hanai et al.
2016/0293133 A1*   10/2016  Dutt .................... G06F 8/20
2017/0186239 A1     6/2017  Hanai et al.

OTHER PUBLICATIONS

Written Opinion issued in Application No. PCT/JP2016/074770, dated Nov. 22, 2016 (10 pages).

* cited by examiner

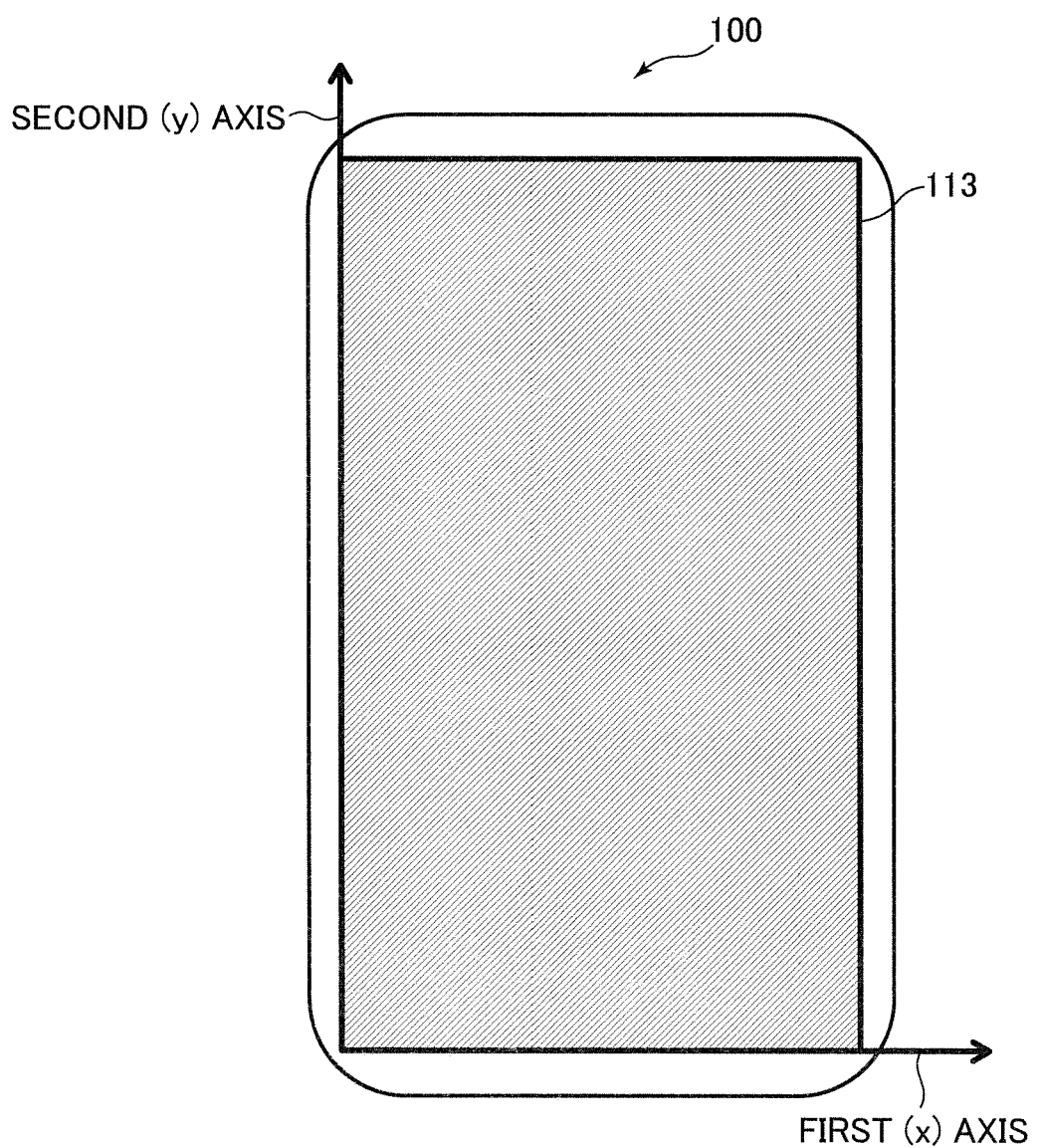

```
2-gram    AB:200 TIMES    BA:1 TIME ...

3-gram    ABA:123 TIMES   ABC:4 TIMES ...

4-gram    ABAB:89 TIMES   BABC:45 TIMES ...

.
            .
            .

N-gram    AA...AA:** TIMES ...
```

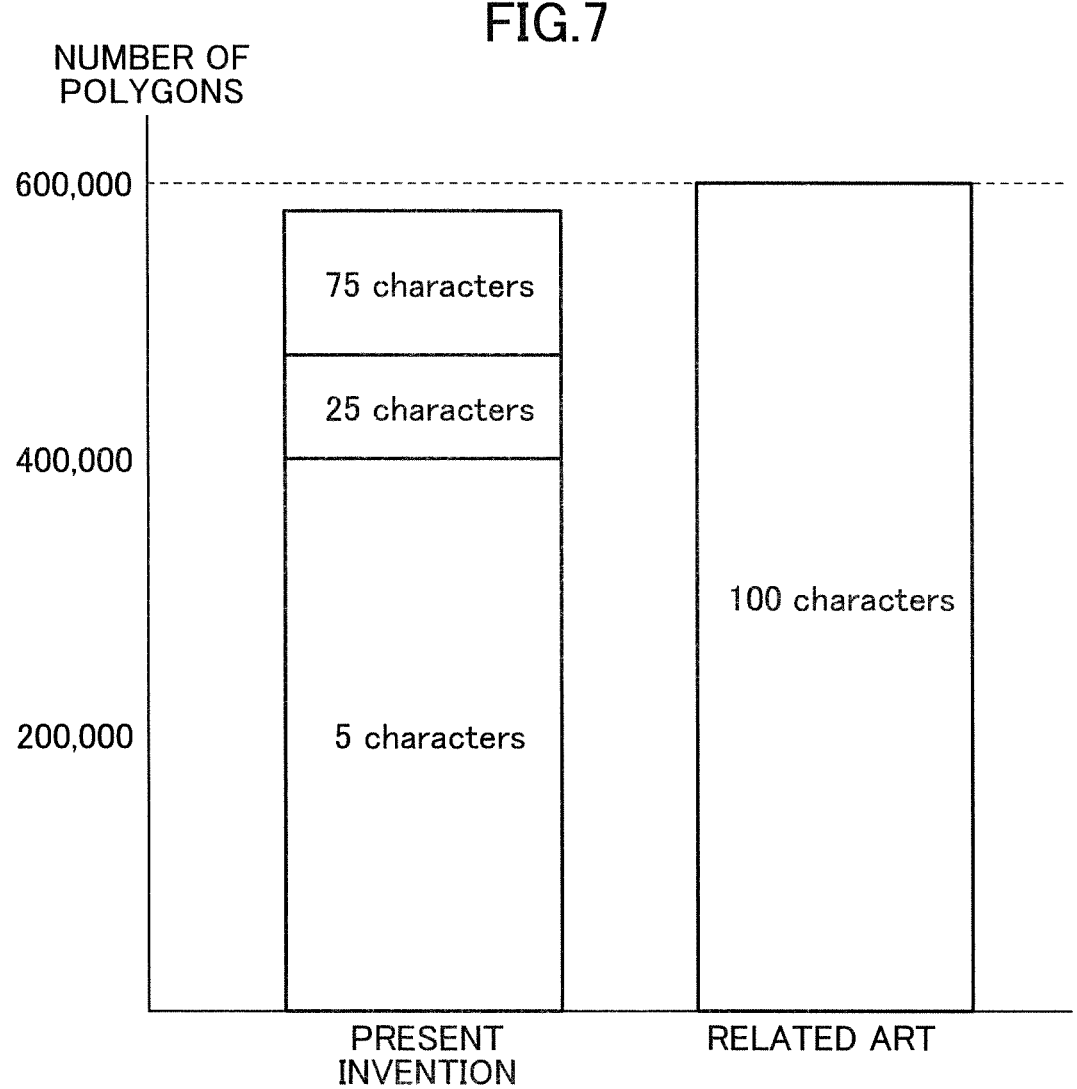

PROGRAM, ELECTRONIC DEVICE, SYSTEM, AND METHOD FOR DETERMINING RESOURCE ALLOCATION FOR EXECUTING RENDERING WHILE PREDICTING PLAYER'S INTENT

TECHNICAL FIELD

The present invention relates to a program, an electronic device, a system, and a method for determining resource allocation for executing rendering while predicting a player's intent on the basis of a history.

BACKGROUND ART

There have hitherto been known methods of drawing three-dimensional graphics by rendering three-dimensional objects constituted of a plurality of polygons disposed in a virtual three-dimensional space. Such three-dimensional graphics are increasingly being used in the field of games. In a game, objects, including characters that can be operated by using a controller, buildings, etc., are disposed in a virtual three-dimensional space, and rendered images of these objects are generated on the basis of a set viewpoint (viewpoint camera). The images are displayed on a display device, such as a display.

Three-dimensional image display is realized, for example, by a GPU in which programmable shaders are implemented. As a method of displaying three-dimensional images by using a GPU, a CPU writes a command relating to rendering to a memory, and the GPU refers to the command and renders objects via the programmable shaders implemented in the GPU. For example, the shaders include a vertex shader that executes processing on vertices, a geometry shader that executes processing to increase or decrease the number of vertices constituting primitives, a pixel shader that executes processing on a per-pixel basis, etc.

The quality of rendering objects that are displayed in a 3D game in which such three-dimensional image display is executed is significantly affected by the number of shader units used to render the objects. That is, objects rendered by using a greater number of shader units have high quality as viewed from a player, whereas objects rendered by using a fewer number of shader units have relatively low quality.

Therefore, in order to realize image quality that appeals to players, it is desired to allocate a greater number of shader units to objects that receive attention in the game. With the recent spread of programmable shaders and GPGPUs, it has become possible to dynamically allocate shader unit resources in real-time rendering of 3D images. For example, in a well-known resource allocation method, a majority of shader units are used as pixel shaders for calculating colors in a sunset scene, whereas a great majority of shader units are used as vertex shaders in a scene in which a large number of polygons are displayed.

Since mobile devices such as smartphones have limitations in the capacities of power supply batteries, implementation areas, etc., GPUs of those devices include only limited numbers of shader units compared with PCs and game machines. Thus, appropriate resource allocation of shader units has a higher importance with mobile devices.

For example, Patent Literature 1, from the same viewpoint, arrived at a technology for alleviating the processing load on a terminal by changing the image resolution of objects that are displayed in accordance with the position of a player's viewpoint.

CITATION LIST

Patent Literature

{PTL 1}
PCT International Publication No. WO 2014/091824

SUMMARY OF INVENTION

Technical Problem

In displaying three-dimensional images, is preferable to have a graphics processing ability that makes it possible to render all objects with high definition; however, GPU resources are limited, as described earlier. In particular, this tendency is apparent with portable devices, such as smartphones. Meanwhile, the recognition ability of human vision is concentrated at the central vision and does not allow detailed recognition of the peripheral vision. Therefore, a player can actually recognize details only for a few objects that the player is consciously paying attention to and is viewing in the central vision. Accordingly, the inventor considered that it was more important to improve the quality of 3D objects as perceived by a player rather than the quality of rendering 3D objects faithfully to their models. That is, the inventor considered that, in order to improve the image quality of games played on smartphones, etc., it was essential to realize a mechanism for allocating GPU resources in accordance with the degree of attention from a player instead of rendering all objects with uniform definition.

Patent Literature 1 discloses a technology in which a region receiving a player's attention is determined by using a camera of a terminal and the resolution of an image to be rendered is chosen to be high or low in accordance with the result of the determination. However, the application of this technology is limited since it requires an external device, such as a camera.

It is an object of the present invention to realize optimal resource allocation in order to improve the effective quality of rendering 3D objects as viewed from a player on an ordinary electronic device by predicting an action that can be taken by the player next without using an external device, such as a camera, in a situation where resources of a kind needed for graphic processing, such as GPU shader units, are limited.

Solution to Problem

The present invention has been made in view of the problem described above and has the following features. Specifically, a program according to an aspect of the present invention is a program that is executed on an electronic device including a display unit and a processing unit in order to determine resource allocation in the processing unit for rendering a plurality of three-dimensional objects disposed in a three-dimensional virtual space, the program causing the electronic device to execute a step of selecting, as candidate objects, objects related to game events from among objects to be rendered on the display unit; a step of determining attention scores representing the degrees of attention that will be paid by a player to the individual selected candidate objects by determining weights relating to the occurrence of individual candidate events, which are events related to the candidate objects, on the basis of the candidate objects, an event or a sequence of events that occurred immediately before, and event history information including information about events that occurred; and a step of determining resource allocation in the processing unit for rendering the individual candidate objects on the basis of the attention scores and depth distances of the candidate objects as viewed from the player.

As an aspect of the present invention, the event history information includes event frequency information representing the frequencies of occurrence of individual patterns of event sequences constituted of two or more consecutive events in a history of events that occurred.

As an aspect of the present invention, the event frequency information includes information representing the frequencies of occurrence of individual patterns of event sequences constituted of not more than N (N≥2) consecutive events, and the step of determining attention scores includes a step of calculating the attention scores for the individual candidate objects by calculating scores representing the possibilities of the individual candidate events occurring next, on the basis of, for each of the candidate events, the frequency of occurrence of a sequence of n (2≤n≤N) consecutive events in the event frequency information, the sequence of n consecutive events being constituted of an event or a sequence of events that occurred immediately before the candidate event and the candidate event.

As an aspect of the present invention, the step of calculating the attention scores includes a step of calculating the scores for each of the candidate events with individual values of n=n1 to n2 (2≤n1<n2≤N), multiplying the calculated scores by predetermined coefficients corresponding to the magnitudes of the values of n, and adding the results together.

As an aspect of the present invention, the program further causes the electronic device to execute a step of storing events that occurred.

As an aspect of the present invention, the electronic device is connected to a server via a network, and the program further causes the electronic device to execute a step of receiving the event history information from the server; and a step of sending information including events that occurred to the server in order to store the events that occurred at the server.

As an aspect of the present invention, the processing unit includes a plurality of shader units, and the resource allocation in the processing unit includes allocation of the shader units used to render the individual candidate objects.

An electronic device according to an aspect of the present invention is an electronic device including a display unit and a processing unit, the electronic device including a candidate-object selecting part configured to select, as candidate objects, objects related to game events from among three-dimensional objects disposed in a three-dimensional virtual space rendered on the display unit; an attention-score determining part configured to determine attention scores representing the degrees of attention that will be paid by a player to the individual selected candidate objects by determining weights relating to the occurrence of individual candidate events, which are events related to the candidate objects, on the basis of the candidate objects, an event or a sequence of events that occurred immediately before, and event history information including information about events that occurred; and a resource-allocation determining part configured to determine resource allocation in the processing unit for rendering the individual candidate objects on the basis of the attention scores and depth distances of the candidate objects as viewed from the player.

A system according to an aspect of the present invention is a system including a server and an electronic device that is connected to the server via a network and that includes a display unit and a processing unit, the server or the electronic device including a candidate-object selecting part configured to select, as candidate objects, objects related to game events from among three-dimensional objects disposed in a three-dimensional virtual space rendered on the display unit; an attention-score determining part configured to determine attention scores representing the degrees of attention that will be paid by a player to the individual selected candidate objects by determining weights relating to the occurrence of individual candidate events, which are events related to the candidate objects, on the basis of the candidate objects, an event or a sequence of events that occurred immediately before, and event history information including information about events that occurred; and a resource-allocation determining part configured to determine resource allocation in the processing unit for rendering the individual candidate objects on the basis of the attention scores and depth distances of the candidate objects as viewed from the player.

As an aspect of the present invention, the server or the electronic device in the system further includes a storage part configured to store events that occurred, and the storage part creates event history information including event frequency information representing the frequencies of occurrence of individual patterns of event sequences constituted of two or more consecutive events in a history of the events stored in the storage part.

As an aspect of the present invention, the event frequency information includes information representing the frequencies of occurrence of individual patterns of event sequences constituted of not more than N (N≥2) consecutive events, and the attention-score determining part includes an attention-score calculating part configured to calculate the attention scores for the individual candidate objects by calculating scores representing the possibilities of the individual candidate events occurring next, on the basis of, for each of the candidate events, the frequency of occurrence of a sequence of n (2≤n≤N) consecutive events in the event frequency information, the sequence of n consecutive events being constituted of an event or a sequence of events that occurred immediately before the candidate event and the candidate event.

A method according to an aspect of the present invention is a method of determining, in a system including a server and an electronic device that is connected to the server via a network and that includes a display unit and a processing unit, resource allocation in the processing unit for rendering a plurality of three-dimensional objects disposed in a three-dimensional virtual space, the method including a step of selecting, as candidate objects, objects related to game events from among objects to be rendered on the display unit; a step of determining attention scores representing the degrees of attention that will be paid by a player to the individual selected candidate objects by determining weights relating to the occurrence of individual candidate events, which are events related to the candidate objects, on the basis of the candidate objects, an event or a sequence of events that occurred immediately before, and event history information including information about events that occurred; and a step of determining resource allocation in the processing unit for rendering the individual candidate objects on the basis of the attention scores and depth distances of the candidate objects as viewed from the player, wherein each of these steps is executed by the server or the electronic device.

Advantageous Effects of Invention

As described above, according to the present invention, an action that can be taken by a player is predicted by analyzing a game event history, objects that are affected by the predicted action or objects that serve as the executors of those actions are extracted as objects having high possibilities of receiving a player's attention, and more resources (shader units, etc.) that determine the rendering quality are allocated in descending order of the possibility of receiving attention.

Thus, for example, when there are ten main objects in a game screen, the number of objects to which a player can pay attention at once is about one to three, and it is acceptable to reduce the rendering quality of objects not receiving attention by about 30%, by applying the present invention to a game, it is possible to improve the rendering quality as viewed from a player by about 10% to 30% compared with before in the case where the same hardware is used. The rendering quality refers to, for example, the number of polygons used to render a single object (LOD) and the complexity of coloration processing by a pixel shader.

Furthermore, the present invention can be implemented on a standard smartphone since it does not require any external device, such as a camera. As opposed to the method of detecting a gaze point by using a camera, the present invention, in which movements in the gaze point of a player are predicted, makes it possible to control the rendering quality in advance of the movements in the gaze point of the player.

Furthermore, as one embodiment of the present invention, by executing prediction of a player's action on the server side, it is possible to allocate GPU resources, such as shader units, without imposing a load on a smartphone.

BRIEF DESCRIPTION OF DRAWINGS

FIG. 2 shows coordinate axes of the touchscreen of the electronic device according to the one embodiment of the present invention.

FIG. 7 shows an example of GPU resource allocation according to the one embodiment of the present invention.

DESCRIPTION OF EMBODIMENTS

Now, embodiments of the present invention will be described with reference to the drawings. A system according to an embodiment of the present invention can be implemented by a system in which a plurality of electronic devices are connected via a network or by a single electronic device. An embodiment in which a system is implemented by a single electronic device will be described first, and then a system connected to a network will be described. Although it is assumed in the description that the system connected to the network is a server-client system, the system may be configured to be a system not including a server, such as a P-to-P system.

Furthermore, although the embodiments will be described mainly in the context of game systems for 3D games, the embodiments may be used in other systems. A game involved in the embodiments is a game in which a plurality of objects are disposed on the screen. For example, a player can select or operate an object by way of a touch operation. The objects include objects related to events and objects not related to events. Hereinafter, what is simply referred to as an object refers to an object related to an event unless specifically mentioned otherwise.

The objects related to events include objects that can be operated by a player, objects with which the objects that can be operated by the player can generate events, and objects that can generate events for the objects that can be operated by the player. Here, an event refers to processing or control generated as a result of a player's operation or processing on the game system side in a game and having a single meaning and unity. When an event occurs due to an operation by the player or an operation by another player or as the game proceeds, predetermined game processing or control is executed. For example, in the case where a plurality of ally characters (objects) that can be operated by the player and a plurality of enemy characters confronting those characters are displayed on the screen, if the player can operate an ally character A1 so as to generate an event of "punching" an enemy character B1, the object A1 is an object related to the event of "punching" the object B1. Meanwhile, if the enemy character B2 can generate an event of "kicking" an ally character A2, the object B2 is an object related to the event of "kicking" the object A2. Regarding these two examples, the object B1 can be an object related to the event of "punching", and the object A2 can be an object related to the event of "kicking". As such, an event is related to at least one object, and each object can be related to one or more events. Furthermore, preferably, identifiers are assigned to the individual objects for the purpose of the identification thereof.

Embodiment Implemented by an Electronic Device

Figure 1A:
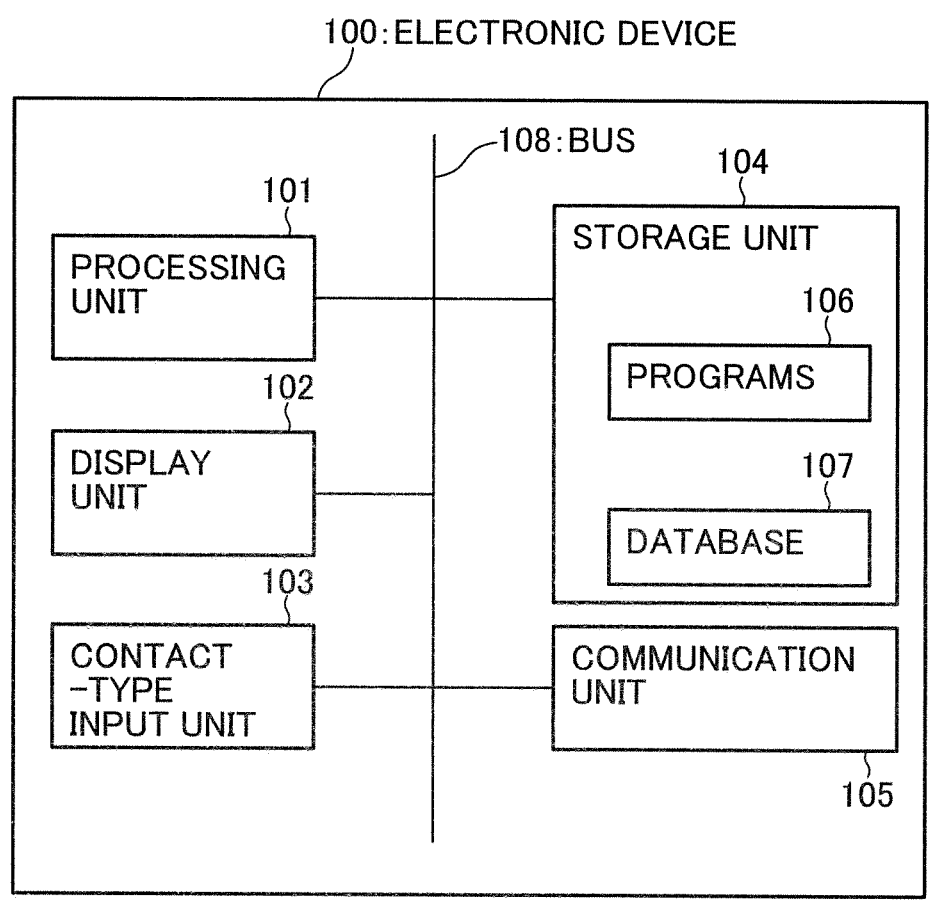
FIG. 1a shows the hardware configuration of an electronic device according to one embodiment of the present invention.

FIG. 1a is a block diagram showing the hardware configuration of an electronic device 100 according to an embodiment of the present invention. The electronic device 100 includes a processing unit 101, a display unit 102, a contact-type input unit 103, a storage unit 104, and a communication unit 105. These components are connected to each other via a bus 108; alternatively, however, the components may be connected individually as needed.

The electronic device 100 is preferably a smartphone; however, it may be, for example, a mobile phone, a portable information terminal, a tablet computer, a video game machine, a portable video game machine, or a computer equipped with a contact-type input device, such as a touchpad.

The processing unit 101 executes various kinds of processing, such as game processing and image generation processing, on the basis of programs 106 and data input from the contact-type input unit 103 or data received from the communication unit 105. The processing unit 101 includes a CPU that controls the components of the electronic device 100 and preferably includes a GPU that executes rendering processing.

The storage unit 104 includes a hard disk, a main memory, and a buffer memory. The hard disk stores the programs 106. However, any type of non-volatile storage that can store information may be used in place of the hard disk. The hard disk may also be of a removable type. For example, in the case where the electronic device 100 is a smartphone, the storage unit 104 includes a ROM and a RAM. The storage unit 104 stores the programs 106 and various kinds of data that can be referred to when the programs are executed. The programs include an operating system, programs for all kinds of applications requiring user input, such as a video game and a Web browser, or a shader program, and preferably include a game engine. The various kinds of data include, for example, image data for displaying various kinds of images, such as objects, etc. that appear in a game, and data that can be written to the storage unit 104 during the game, such as coordinates. Furthermore, the storage unit 104 includes a database 107 relating to event history information and frequency information of histories of consecutively generated events. Preferably, the database 107 includes an event-history-information database relating to event history information including information about events that were generated and an event-frequency-information database relating to event frequency information based on the event history information and representing the frequencies of occurrence of individual patterns of event sequences constituted of two or more consecutive events.

The communication unit 105 carries out wired communications using an Ethernet (registered trademark) cable or the like or wireless communications such as mobile communications or wireless LAN communications to connect to a network 101.

The display unit (display) 102 displays images that are output as the results of execution of the programs 106. The display unit 102 is preferably a liquid crystal display; alternatively, however, the display unit 102 may be an organic EL display, a plasma display, or the like.

Figure 1B:
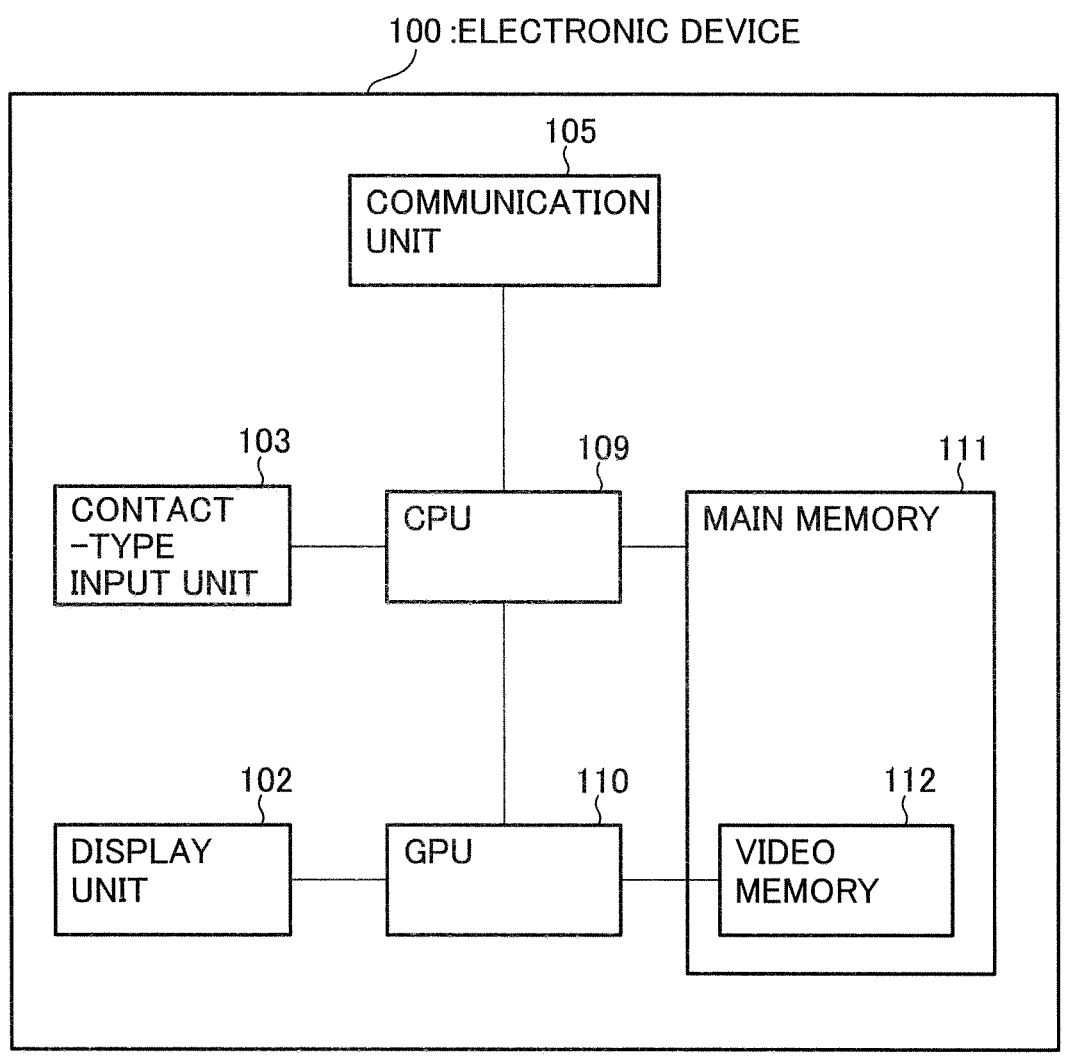
FIG. 1b shows the hardware configuration of an electronic device including a CPU and a GPU, according to one embodiment of the present invention.

FIG. 1*b* shows a block diagram showing the hardware configuration of the electronic device 100 according to one embodiment in the case where the processing unit 101 includes a CPU and a GPU. A CPU 109 writes a rendering command to a main memory 111. A GPU 110, which includes a plurality of shader units that are not shown, refers to the rendering command, writes rendering data to a frame buffer on a video memory 112, and directly renders the content read from the frame buffer on the display unit 102. As one Example, the CPU 109 stores rendering data, such as primitives, in a buffer on the main memory 111, and transfers the rendering data to the buffer on the video memory 112, which is managed, for example, by using OpenGL (registered trademark), and the GPU 110 processes the rendering data through a graphics pipeline and directly renders the result on the display unit 102.

The contact-type input unit 103 provides the electronic device 100 with an input based on a position touched by a player, for example, like a touchpad. Preferably, the display unit 102 and the contact-type input unit 103 are integrated as a touchscreen; alternatively, however, the display unit 102 and the contact-type input unit 103 may be disposed at different positions as separate units. For example, in the case where the display unit 102 and the contact-type input unit 103 are integrated as a touchscreen, an input based on a player's touch on the display unit 102 is accepted, and the contact-type input unit 103 detects the coordinates corresponding to the position touched by the player and supplies the coordinates to the electronic device 100. Although any detection method, such as a capacitive detection method for a touchscreen, may be used, preferably, the contact-type input unit 103 is of the type that can detect player's fingers or the like simultaneously touching two or more points and supply coordinate information corresponding to the individual detected positions to the electronic device 100.

Here, a touch refers to an operation or state in which a finger or the like contacts the contact-type input unit 103, i.e., the touchscreen in this embodiment. Although it is assumed in the description of this embodiment that a touch by a player is made by using a finger of the player, any finger may be used for touching, or something else may be used, such as a stylus. Meanwhile, a release is an operation or state in which a finger or the like is apart from the touchscreen. A player operates the electronic device 100 mainly by touching and releasing. Such touch operations may include touch, long touch, multi-touch, release, swipe, tap, double tap, long tap, drag, flick, etc. For example, a tap is an operation in which a release is performed following a touch without moving the touched position. Preferably, the processing unit 101 distinguishes among some or all of the kinds of touch operations on the basis of a contact, a contact position, a contact period, or the number of contacts on the touchscreen with a finger or the like.

For example, in the case where a smartphone is used as the electronic device 100, the display unit 102 and the contact-type input unit 103 are integrated as a touchscreen 113. In the contact-type input unit 103, a position is designated in the form of coordinates by using a coordinate plane defined by a first axis and a second axis substantially perpendicular to the first axis. Preferably, as shown in FIG. 2, the first axis is substantially parallel to the shorter sides of the touchscreen 113 (the contact-type input unit 103), which has a substantially rectangular shape, the second axis is substantially parallel to the longer sides of the touchscreen 113, and a position is represented in the form of coordinates (x, y) based on a coordinate axis in the first axis direction (horizontal axis) and a coordinate axis in the second axis direction (vertical axis). The processing unit 101 can obtain, by using a program or the like, a touched position detected by the touchscreen 113 in the form of data of such coordinates (x, y). For example, in the case where the detection precision of the touchscreen 113 is 640 dots x 1136 dots, a resolution of 640 dots in the horizontal axis direction and 1136 dots in the vertical axis direction can be attained. In this case, each dot may be either a single point or a certain region (cell). Note, however, that the distance between dots usually varies among touchscreens (electronic devices). In this description, the term "distance" should be construed to mean a distance in coordinates unless explicitly mentioned otherwise. The setting of coordinates shown in FIG. 2 is an example, and coordinate axes can also be set by a program. Alternatively, polar coordinates can be set, and other kinds of coordinate system can be set through coordinate transformation.

As another example, in the case where the display unit 102 and the contact-type input unit 103 are disposed at different positions as separate units, it is possible to set coordinates as described above in the contact-type input unit 103, while setting coordinates corresponding to the coordinates for the contact-type input unit 103 in the display unit 102.

Figure 3:
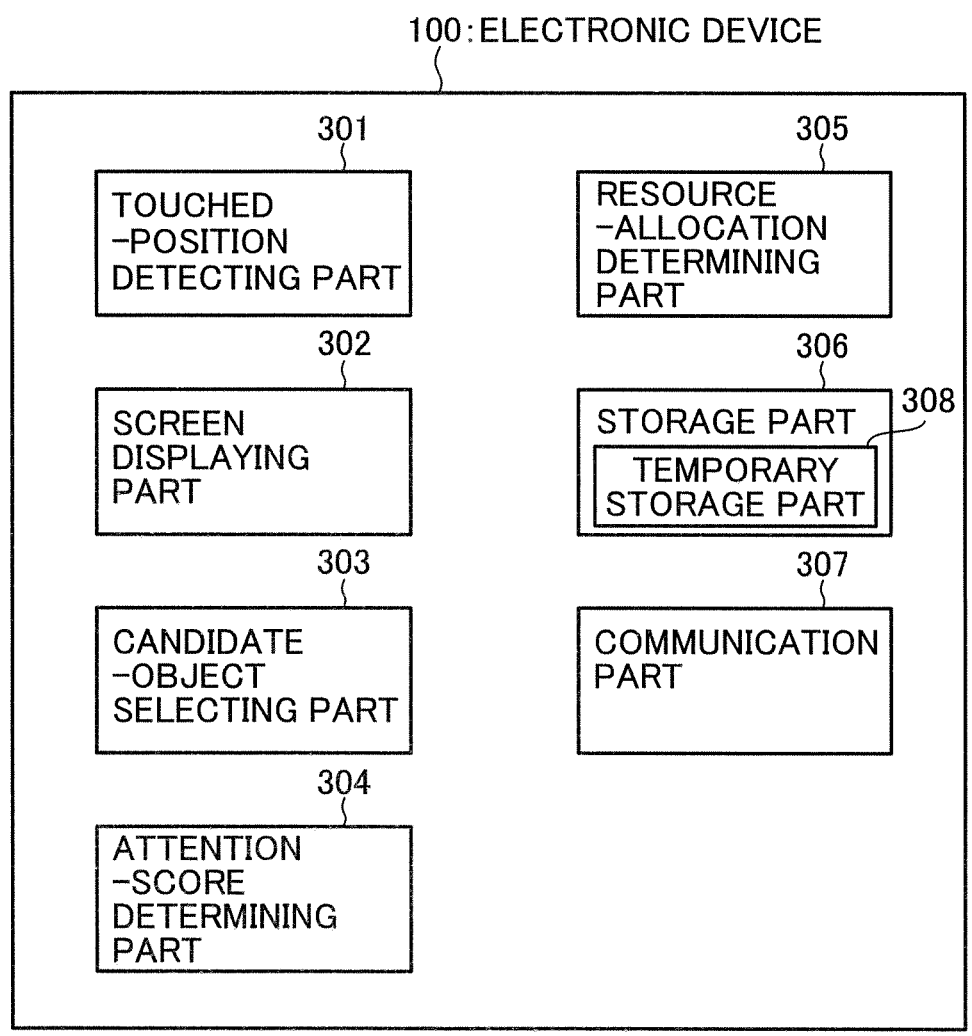
FIG. 3 shows a functional block diagram of the electronic device according to the one embodiment of the present invention.

FIG. 3 shows an example of the functional block diagram of an electronic device according to the present invention. The electronic device 100 includes a touched-position detecting part 301, a screen displaying part 302, a candidate-object selecting part 303, an attention-score determining part 304, a resource-allocation determining part 305, a storage part 306, a communication part 307, and a temporary storage part 308.

The touched-position detecting part 301 has a function for detecting a position touched by a player on the contact-type position input unit 103 and supplying the position to the electronic device 100.

The screen displaying part 302 has a function for displaying an output from the electronic device 100 on the display unit 102, and it displays objects on the display unit 102. For example, the screen displaying part 302 renders the data written to the frame buffer on the video memory shown in FIG. 1b on the display unit 102.

The candidate-object selecting part 303 has a function for selecting objects related to game events from among the objects displayed by the screen displaying part 302. The candidate-object selecting part 303 may select, among the objects related to game events, only objects that can be operated by the player or only objects that can be operated by the player and objects that can generate events for the objects that can be operated by the player.

The attention-score determining part 304 has a function for determining attention scores representing the degrees of attention that will be paid to the individual selected candidate objects by the player by determining weights relating to the occurrence of individual candidate events, which are events related to the candidate objects, on the basis of the selected candidate objects, an event or a sequence of events (two or more consecutive events) that occurred immediately before, and event history information including information about events that occurred. The event or events that occurred immediately before refer to the latest event or events among the events that have occurred before the current point in time during the player's operation.

The weights relating to the occurrence may be scores representing the possibilities of occurring next or may be priorities relating to occurrence. For example, in the case where the weights relating to the occurrence are scores representing the possibilities of occurring next, scores for the individual candidate events are calculated as the weights relating to the occurrence of the individual candidate events. For example, the scores are calculated on the basis of event-history frequency information and numerically represent the possibilities of the occurrence of the individual candidate events. In this case, attention scores of the individual candidate objects are calculated on the basis of the abovementioned scores and are preferably normalized. Furthermore, as described earlier, a candidate object may be related to two or more candidate events. In this case, the attention score of the candidate object related to two or more candidate events can be calculated on the basis of the sum of the individual scores of those candidate events.

The resource allocating part 305 has a function for determining resource allocation of the processing unit 101 for rendering the individual candidate objects on the basis of the determined or calculated attention scores and the depth distances of the candidate objects as viewed from the player. The resource allocation of the processing unit 101 for rendering objects refers to the allocation of shader units in the GPU 110, and for example, the number of polygons used in rendering the objects is changed as a result of this allocation. Furthermore, as resource allocation based on the depth distances of the objects as viewed from the player, it is possible to include LOD (Level of Detail), with which the number of polygons is decreased in accordance with the distance from the viewpoint camera. The resources of the processing unit 101 for rendering include resources that are dynamically allocated by the resource allocating part 305 and statically allocated resources. For example, objects other than the candidate objects are rendered by using the statically allocated resources, and the objects are preferably rendered by using fewer resources than the resources allocated to the individual candidate objects by the resource allocating part 305. In the case where there is no candidate object, all the resources of the processing unit 101 are allocated statically.

The storage part 306 has a function for storing programs, data, etc. in the storage unit 104. The temporary storage part 308 included in the storage part 306 has a buffering function for temporarily accumulating data, and it accumulates a history of the occurrence of events related to objects in a buffer. In the accumulated event history information, event history information up to the current time of the player's operation is maintained, preferably until a certain period elapses or a certain number of pieces of information are accumulated. The storage part 306 accumulates, preferably regularly, the history information accumulated in the buffer in the event-history-information database. Furthermore, the storage part 306 aggregates the frequencies of occurrence of individual patterns of event sequences constituted of two or more consecutive events on the basis of the event history information and stores event frequency information representing the frequencies of occurrence in the event-frequency-information database. The attention-score determining part 304 can obtain event history information or event frequency information needed for determining attention scores by querying the database 107 by using the event history information accumulated in the buffer as a query. In this embodiment, the event history information and the event frequency information should preferably be stored individually in separate databases. However, since the event frequency information is information that is created on the basis of the event history information, the event history information can be construed as a constituent element having a broad concept encompassing the event frequency information. Note that the event frequency information may be created while taking into account some other information as well as the event history information in consideration of the kind, nature, etc. of the game for which the present invention is implemented. The event frequency information is not necessarily information that is created from the event history information alone. For example, by applying strong weights to events having important meanings in the game, processing in which frequency information involving those events are preferentially handled may be realized.

The communication part 307 has a function for carrying out wireless communications and wired communications.

The storage part 306 can obtain a program or data from a server, an optical disk, etc. via the communication part 309 and store the program or data therein.

These functions of the electronic device 100 are realized by executing the programs 106. Thus, part of the function of one part may be provided in another part. Note that some of these functions may also be realized by configuring electronic circuits or the like.

Figure 4:
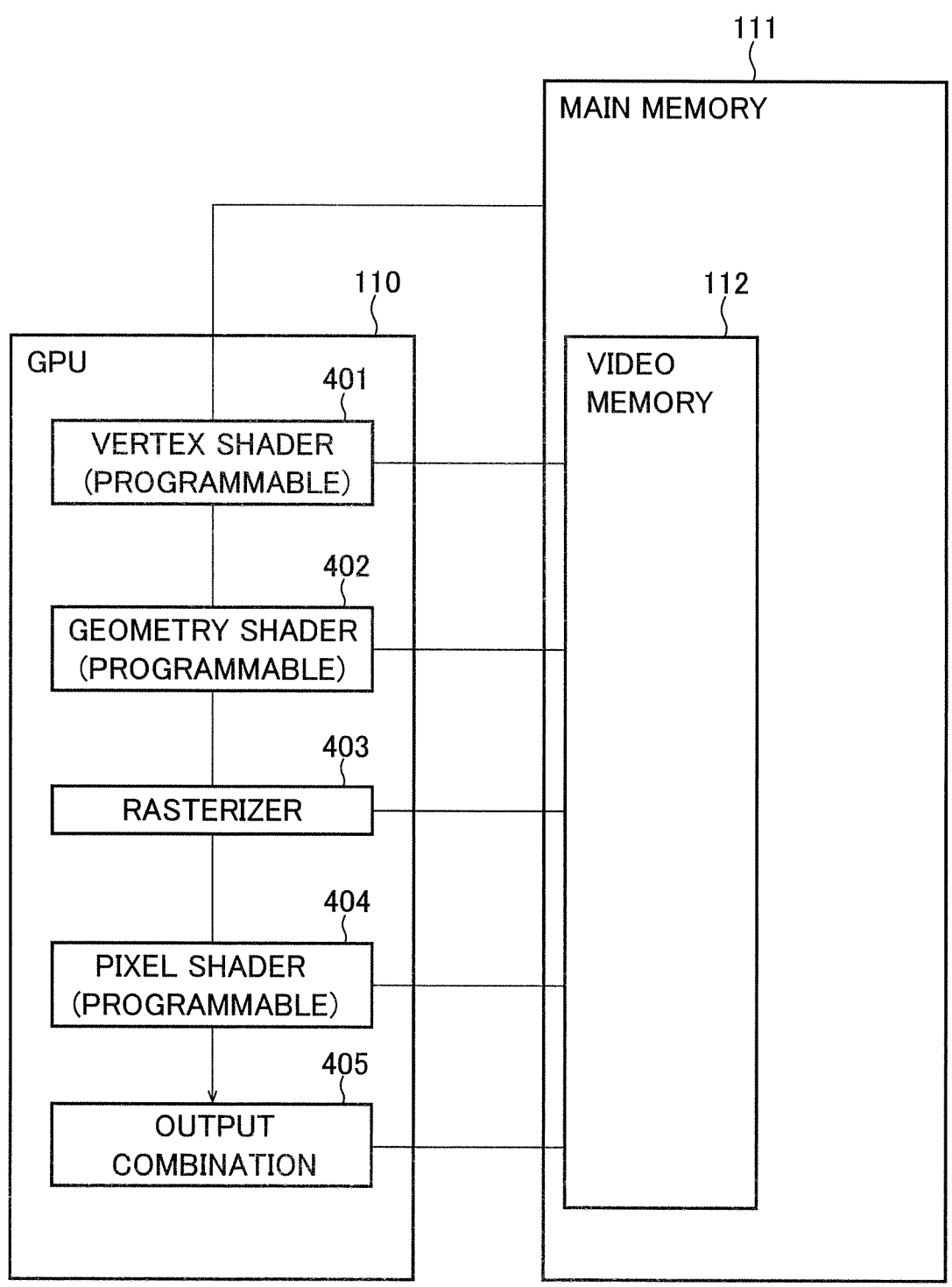
FIG. 4 shows a graphics pipeline of the GPU according to the one embodiment of the present invention.

FIG. 4 is a diagram showing a graphics pipeline of the GPU 110 according to one embodiment of the present invention, which is used to calculate three-dimensional images. The graphics pipeline includes a vertex shader 401, a geometry shader 402, a rasterizer 403, a pixel shader 404, and an output combination 405. The graphics pipeline is shown as an example for the convenience of explanation, and the pipeline may consist of fewer stages, include further stages, or include alternative stages.

The vertex shader 401 applies changes to attribute information of vertices. The attribute information of vertices are constituted of positions, vertex colors, normal lines, information for animation, texture coordinates for texture mapping, etc. In the stage of the vertex shader 401, coordinate transformation, such as transformation into a coordinate system as viewed from a virtual camera, shape transformation processing for character animation, etc. are executed. Furthermore, calculation for lighting may also be executed by the vertex shader 401. The vertices calculated by the vertex shader 401 are usually passed to the geometry shader 402 or are directly passed to the pixel shader 404.

The geometry shader 402 is used to process sets of vertices in objects, passed to the rasterizer 403 or the pixel shader 404. The geometry shader 402 can increase or decrease the number of vertices at the time of execution. In this case, the number of vertices belonging to a primitive that is input may be changed when the primitive is output. Furthermore, in the geometry shader 402, there are cases where processing is executed through a plurality of stages, as in the case of processing in which a primitive that has once been processed by the geometry shader 402 is saved in a cache of the GPU and is again input to the geometry shader 402. Furthermore, instead of passing an output from the vertex shader 401 or the geometry shader 402 to the rasterizer 403 or the pixel shader 404, the graphics pipeline may write it to a memory resource, such as the buffer on the video memory, and then input it again to the vertex shader 401 or the geometry shader 402 without the intervention of the CPU.

The rasterizer 403 prepares primitive for the pixel shader 404 and executes processing for dividing the primitives into sets of pixels. For example, the rasterizer 403 generates fragments from primitive information constituted of vertices. Each of the fragments is accompanied with information such as a normal line and texture coordinates as well as position information. These pieces of information are obtained by way of interpolation calculation based on the vertex position information.

The pixel shader 404 sequentially processes the pixels generated by the rasterizer 403. Here, the pixel shader 404 executes processing for determining the final colors of the pixels (shading). The processing for shading includes processing such as texture mapping and lighting. Furthermore, various other kinds of processing are executed as processing on a per-fragment basis.

The output combination 405 combines various types of output data (such as pixel shader values, depths, and stencil information) in order to generate the final results.

Generally, a graphics pipeline includes a programmable stage and a fixed function stage. For example, an operation relating to a stage of the graphics pipeline is executed by a programmable shader, and another operation relating to another stage of the graphics pipeline is executed by a non-programmable fixed-function hardware unit, such as a fixed function unit.

In FIG. 4, for example, the vertex shader 401, the geometry shader 402, and the pixel shader 404 are programmable shaders, and these shaders may be configured individually or may be integrated and configured as an integrated shader.

Generally, in applications such as games, a game engine generates graphics commands at predetermined time intervals anticipated in advance and sends the graphics commands to the GPU. For example, in the case where the electronic device 100 is a smartphone, the screen is updated at intervals of a certain time (e.g., 1/30 seconds or 1/60 seconds). Furthermore, although the conventional known LOD in which the number of polygons is reduced in accordance with the distance from the viewpoint camera may be implemented in the game engine, the LOD may be implemented in a shader program.

Figure 5:
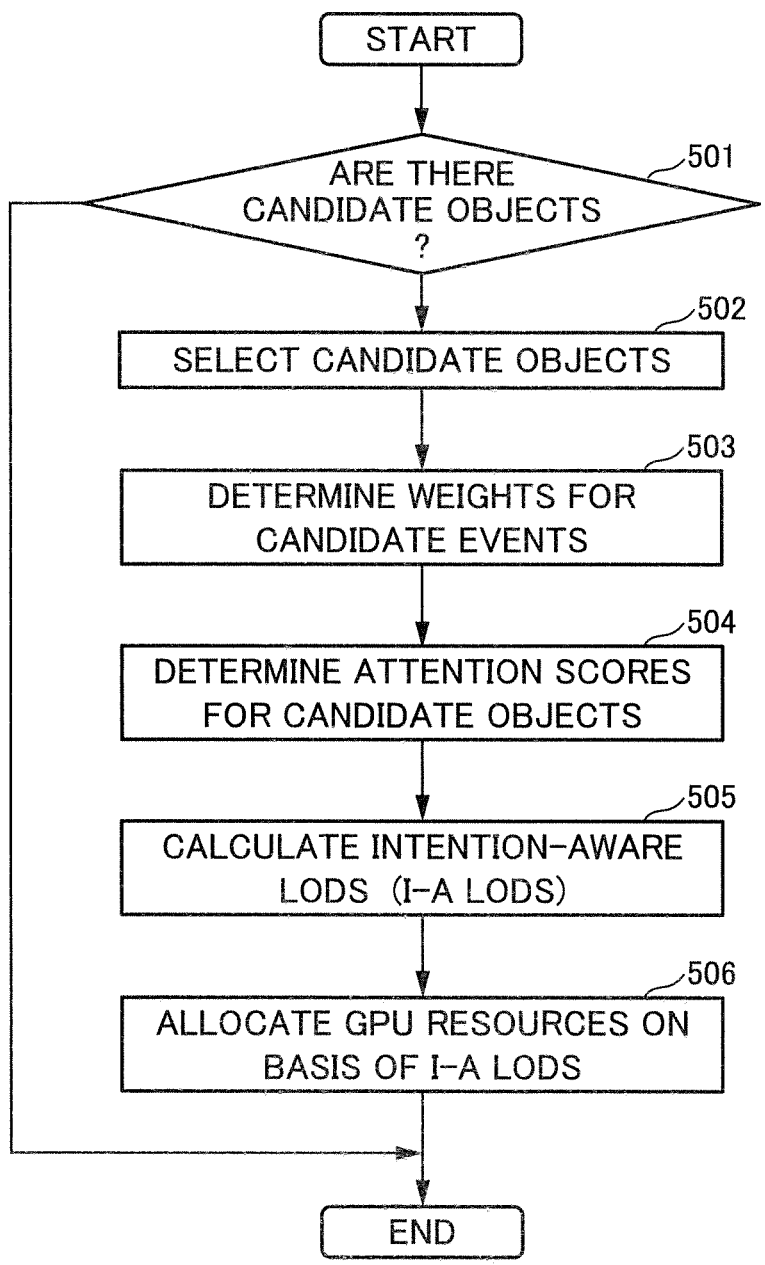
FIG. 5 is a flowchart showing information processing according to the one embodiment of the present invention.

FIG. 5 is a flowchart showing information processing according to one embodiment of the present invention. The information processing in this flowchart is preferably executed by a shader program (the GPU side); however, some or all of the steps may be executed by an application (the CPU side).

In the state at the start of this flowchart, on the CPU side, a rendering command has been written to the main memory, and vertex attribute information has been stored in a buffer object allocated in the video memory. In step 501, it is determined whether or not there are candidate objects, which are objects related to game events, from objects to be rendered on the display unit. The objects to be rendered on the display unit refer to objects that are to be rendered immediately by the GPU. In the case where there are candidate objects, the candidate objects are selected in step 502. Each of the candidate objects may have an ID of a buffer object. In the case where there is no candidate object, the flow is terminated, and processing is executed by the existing graphics pipeline described above. This flow is preferably executed at the intervals of the screen updating time described earlier.

As one Example, the candidate objects may be objects that are related to game events and that can be operated by the player among the objects to be rendered on the display unit. In this case, resources can be allocated so that the objects operated by the player will be rendered preferentially.

Then, in step 503, weights relating to the occurrence of the individual candidate events, which are events related to the candidate objects, are determined. In this flowchart, the weights relating to the occurrence are scores representing the possibilities of occurring next, and scores for the individual selected candidate events are calculated on the basis of the candidate objects, an event or a sequence of events that occurred immediately before, and the event history information including information about events that occurred.

Figures 6A, 6B:
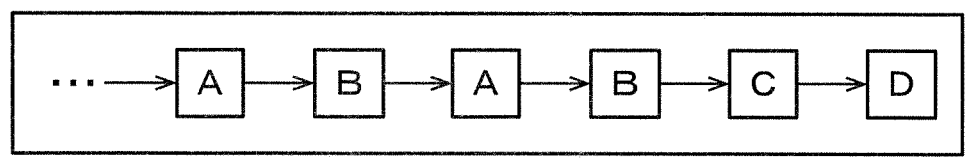
FIG. 6a shows a history of events that occurred, according to the one embodiment of the present invention.
FIG. 6b shows a state where the history of events that occurred has been divided into combinations of N consecutive elements, according to the one embodiment of the present invention.

In this embodiment, a history of events that occurred is stored as shown in FIG. 6a. The stored event history is related to objects. As one Example, in the case where the candidate objects are objects that are related to game events and that can be operated by the player among the objects to be rendered on the display unit, the stored event history is a history of events related to the objects that can be operated by the player. The temporary storage part 308 accumulates a history of events that occurred as event history information in a buffer, and the storage part 306 stores the accumulated data in the event-history-information database. Preferably, the accumulated data is regularly stored in the event-history-information database. The storage part 306 aggregates the frequencies of occurrence of individual patterns of event sequences constituted of two or more consecutive events from the event history information and stores event frequency information representing the frequencies of occurrence in the event-frequency-information database. Note, however, that since events are related to objects, as described earlier, events may have concepts equivalent to those of objects themselves depending on the embodiment. In this case, for example, the stored event history shown in FIG. 6a may be a history of objects. The storage part 306 may be configured not to store the event history information accumulated in the buffer in the event-history-information database. In this case, event history information that is obtained in advance is stored in the event-history-information database.

In calculating the scores, the event-frequency-information database is queried by using, as queries, event sequences in which the candidate events are added to a part of or the entire event history information accumulated in the buffer.

Step 503 includes processing as a whole for an action prediction method based on the past event history information or the frequency information of the past event histories. As one embodiment thereof, a score calculating method using n-grams will be described.

Figures 6C, 6D:
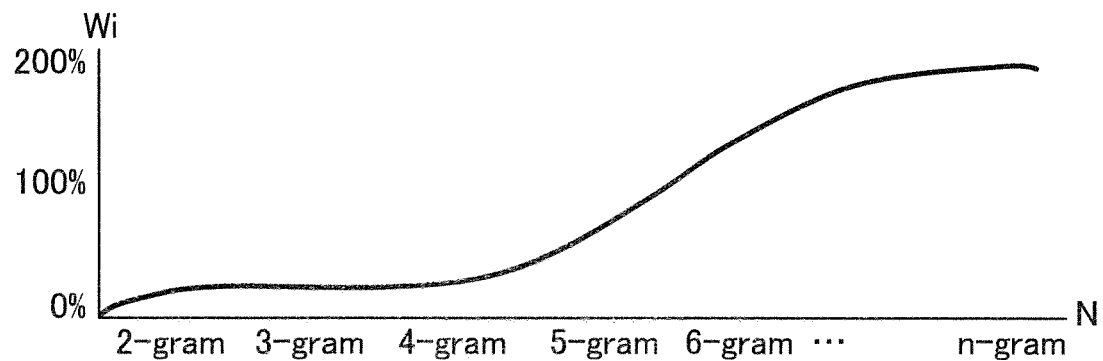
FIG. 6c shows a state where the frequencies of occurrence of the individual combinations of N consecutive elements in the history of events that occurred have been aggregated and indices have been created, according to the one embodiment of the present invention.
FIG. 6d shows an example of a function wi used in a score function, according to the one embodiment of the present invention.

First, the data that is stored in the database 107 as event frequency information will be described. As a model for predicting an event that occurs next on the basis of the immediately preceding (N−1) event logs, indices for accumulating event frequency information are created in accordance with the numbers of events to be traced back in order to analyze concatenations among the event logs, like one log before (N=2), two logs before (N=3), and three logs before (N=4). As described earlier, the event history is stored as shown in FIG. 6a. In the example in FIG. 6a, an event history is recorded in the order A→B→A→B→C→D. In the n-gram model, as shown in FIG. 6b, this operation history is divided into N consecutive combinations (event sequences), like 2-grams, 3-grams, 4-grams, and so forth, and the frequencies of occurrence of the individual combinations are aggregated. For example, in the case of 2-grams, the operation history A→B→A→B→C→D is divided into five kinds of combinations of two elements AB, BA, AB, BC, and CD, and the occurrence of these combinations is added individually to the corresponding frequency information. In the case of 3-grams, the operation history A→B→A→B→C→D is divided into four kinds of combinations of three elements ABA, BAB, ABC, and BCD, and the occurrence of these combinations is added individually to the corresponding frequency information. By dividing the history of N consecutive elements and calculating the frequencies of occurrence in this manner, it is possible to create indices in which a combination having a high frequency of occurrence indicates a combination of events that occurs frequently, as shown in FIG. 6c. For example, the data structure H of the indices shown in FIG. 6c is as follows:

H:={<ngram1, frequency1>,<ngram2, frequency2>, ..., <ngramk, frequencyk>}

Here, ngramk signifies the k-th kind of n-gram, and frequencyk signifies the value of the frequency of occurrence associated therewith.

Next, the method of comparing against the event frequency information will be described. A method of calculating scores in the case where candidate objects X, Y, and Z are selected will be described. For example, assuming that there are three events (X1, X2, and X3) related to the candidate object X, there are two events (Y1 and Y2) related to the candidate object Y, and there is one event (Z1) related to the candidate object Z, n-gram keys in which the candidate events related to the individual candidate objects are added to the tail are generated. In the case where the player has performed operations in the order A→B→A→B→C→D, as shown in FIG. 6a, for example, n-grams are generated from the candidate event X1 like DX1 (2-gram), CDX1 (3-gram), BCDX1 (4-gram), and so forth, and combinations are generated repeatedly until reaching a combination of N elements.

The present system compares the generated n-grams as queries against all the frequency information accumulated so far in the event-frequency-information database and assigns a higher score to a candidate event as the frequency of occurrence thereof becomes higher and the value of n of the n-gram increases. A function score for calculating a score according to one embodiment is expressed in equation (1).

$$\text{score}(p, x, H) = \sum_{i=2}^{n} (w_i \cdot \text{freq}(H, Q)) | Q \leftarrow \text{query}(p, i, x) \quad (1)$$

Here, p signifies a sequence of (N−1) events that have occurred so far in the event history, x signifies a candidate event, and H signifies a database of all the frequency information accumulated so far. The function score uses two internal functions. A first function is query (p,i,x). With this function Q (query(p,i,x)), (n−1) elements are picked up from the tail of the sequence of (N−1) events that have occurred so far in the event history, and x is added to the tail of those elements to generate a new combination. With this function, it is possible to generate a n-gram that serves as a query, as described earlier. A second function is freq(H,Q). This is a function for calculating the frequency of occurrence of a query generated by the query( )function in the frequency information database. Furthermore, in this embodiment, preferably, a match with a longer combination (event sequence) is considered as matching a clearer player's intent, and a greater coefficient is applied as the value of n of the index increases. This coefficient is wi in the equation. Since i is a variable that increases from 2 to N, it is possible to implement wi as a function with which the degree of reflection on the score becomes stronger as the value of i increases. For example, a function with which wi is increased non-linearly as the value of i increases may be adopted, as shown in FIG. 6d.

In step 504, attention scores for the individual candidate objects are determined by using the scores for the candidate events calculated as described above. As one Example, the attention score for each candidate object is calculated by adding together the scores for the candidate events related to that candidate object and normalizing the result. As another Example, the attention score of each candidate object is calculated by adding together the scores for the candidate events related to that candidate object, multiplying a predetermined coefficient in accordance with the number of candidate events involved in the addition, and normalizing the result.

Then, in step 505, index values for determining the resource allocation for rendering 3D objects are calculated by using the determined or calculated attention scores. In this embodiment, Intention-Aware LOD defined by the following equation is used as an index value for determining the resource allocation.

$$\text{Intention-Aware LOD}(p,x,H) = \text{intention-score}(p,x,H) \\ *\text{distance}(x) \quad (2)$$

Here, the intention-score function represents the attention score for the candidate object x, calculated on the basis of the score function in equation (1). The distance function represents weighting in accordance with the distance from the viewpoint camera in the game space, which corresponds to the conventional LOD. By multiplying these functions, it is possible to calculate a new index value corresponding to the degree of attention from the player according to the present invention and the conventional LOD.

Then, in step 506, GPU resources are allocated on the basis of the calculated index values. For example, the GPU resource allocation is the allocation of the number of polygons used to render the candidate objects. As a specific method of realizing resource allocation, for example, a lookup table in which identifiers assigned to objects are associated with IDs used in buffer objects is prepared, and primitives are dynamically increased or decreased by the geometry shader by using the lookup table and the calculated index values. Note, however, that the resources that are dynamically allocated in step 506 do not include all the resources of the processing unit for rendering, as described earlier. The primitives include polygons (typically triangles), normal vectors, points, etc., and in the case where the primitives are triangles, each of the triangles is defined by three vertices. For example, in the case where vertex data of a 3D model having the highest definition is stored in a buffer object, primitives are dynamically reduced by the geometry shader.

Now, an implementation method using GLSL will be described as one Example. As a transform feedback function, OpenGL provides a function for storing the results of calculation by a vertex shader or a geometry shader in a vertex buffer object (VBO) without the intervention of a CPU. Since it is possible to use the content of the vertex buffer object as a vertex attribute that is input to the vertex shader, the transform feedback function makes it possible for a GPU to update/reduce vertex attributes by itself. This makes it possible to implement the dynamic and real-time control according to the present invention within the GPU.

FIG. 7 shows an example of GPU resource allocation as one Example. The graph in FIG. 7 shows a comparison between a conventional rendering method (right in the graph) and the rendering method according to the present invention (left in the graph) in the case where game characters are rendered on a smartphone having a GPU that is capable of displaying 600,000 polygons at once. The total number of polygons displayed in one screen is the same between the present invention and the conventional method when the same hardware is used for both of these methods. Thus, the total values for these methods are substantially the same in the stacked bar graph in FIG. 7. Meanwhile, the maximum number of polygons used to render a single character considerably varies. With the rendering according to this invention, it is possible to render only characters receiving the player's attention by using 80,000 polygons; whereas with the conventional rendering method, since all the characters are rendered uniformly, the maximum number of polygons is 6,000. That is, the present invention makes it possible to improve the rendering quality as perceived by the player by a factor of ten or even greater compared with the conventional method by using the same hardware.

Embodiment Implemented by a System

Figure 8:
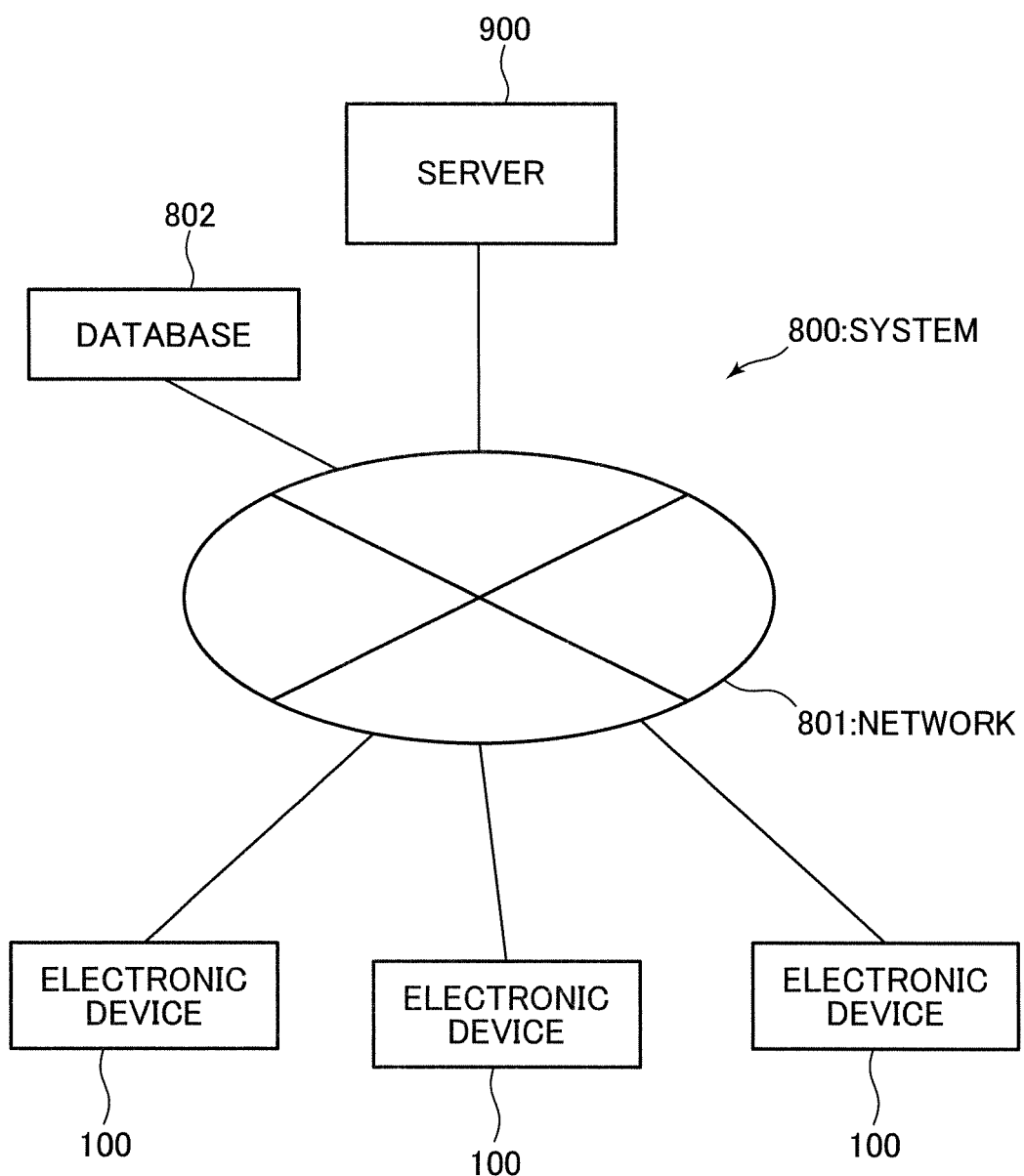
FIG. 8 shows an example of the overall configuration of a system according to an embodiment of the present invention.

FIG. 8 shows an example of the overall configuration of a system according to one embodiment of the present invention. A system 800 is configured to include a plurality of electronic devices 100 and a server 900. These components are connected to each other via a network 801; alternatively, however, the components may be connected individually as needed. Also, in the case where one of the plurality of electronic devices also functions as a server, the system 800 may be configured not to include the server 900. Furthermore, the system 800 may also include a database 802. In the case where the system 800 includes the database 802, the database 802 stores event history information or frequency information of histories of events that occurred consecutively, and the electronic devices 100 or the server 900 can obtain desired data by querying the database 802. Although the use of a database in the server 900 is mainly assumed in the following description, the description similarly applies to the case where the database 802 directly connected to a network is used.

Figure 9:
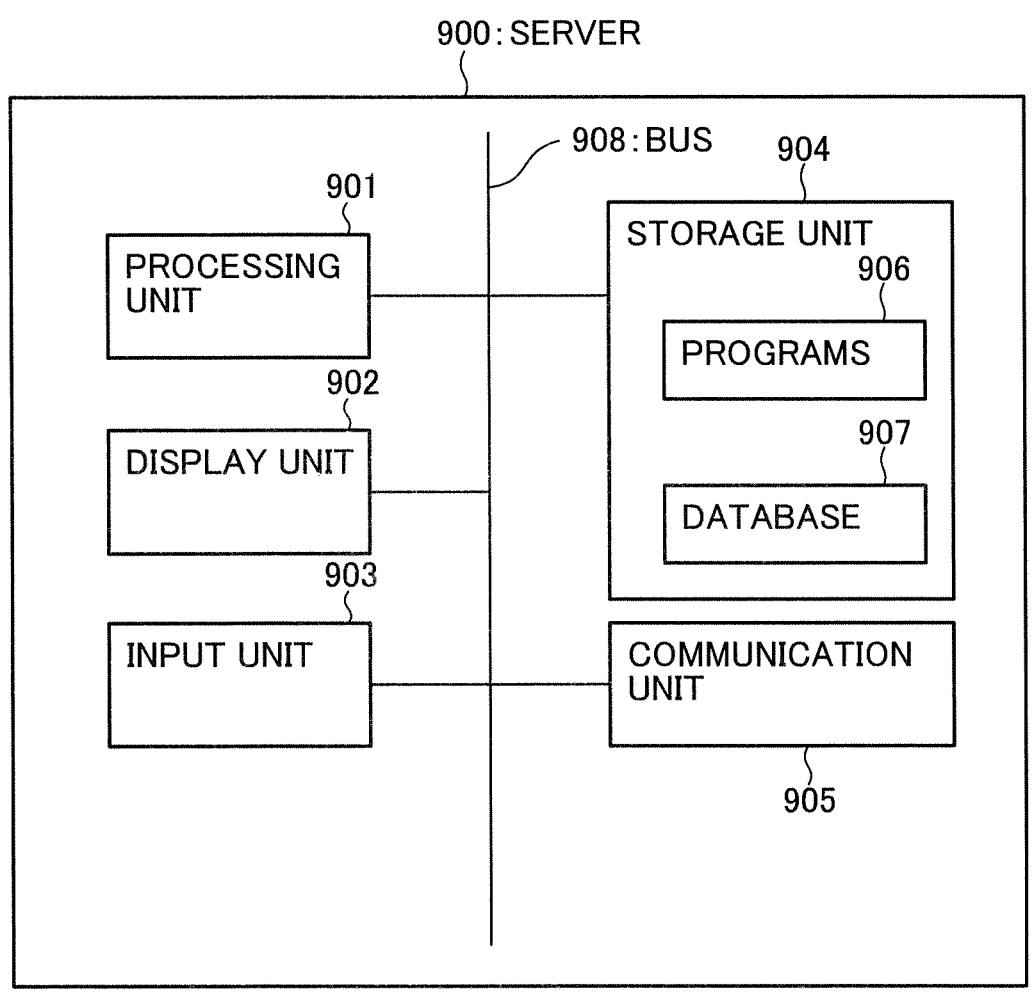
FIG. 9 shows the hardware configuration of a server according to an embodiment of the present invention.

FIG. 9 is a block diagram showing the hardware configuration of the server 900 according to an embodiment of the present invention. The server 900 includes a processing unit 901, a display unit 902, an input unit 903, a storage unit 904, and a communication unit 905. These components are connected to each other via a bus 908; alternatively, however, the components may be connected individually as needed.

The processing unit 901 includes a processor that controls the components of the server 900, and it executes various kinds of processing by using the storage unit 904 as a work area. The display unit 902 has a function for displaying information to a user. The input unit 903 has a function for accepting inputs from the user, like a keyboard and a mouse.

The storage unit 904 includes a hard disk, a main memory, and a buffer memory. The hard disk stores the programs 906. However, any type of non-volatile storage that can store information may be used in place of the hard disk. The hard disk may also be of a removable type. The storage unit 904 stores the programs 906 and various kinds of data that can be referred to when the programs are executed. Furthermore, the storage unit 904 may include a database 907 relating to event history information and frequency information of histories of events that occurred consecutively. In this case, the database 907 preferably includes an event-history-information database relating to event history information including information about events that occurred and an event-frequency-information database relating to event frequency information based on the event history information and representing the frequencies of occurrence of individual patterns of event sequences constituted of two or more consecutive events. The communication unit 905 carries out wired communications using an Ethernet (registered trademark) cable or the like or wireless communications such as mobile communications or wireless LAN communications to connect to the network 801.

The various functions of the server 900 are realized by executing the programs 906; alternatively, however, some of the functions may also be realized by configuring electronic circuits or the like.

The hardware configuration of the electronic device 100 is shown in FIG. 1*a*.

Figure 10:
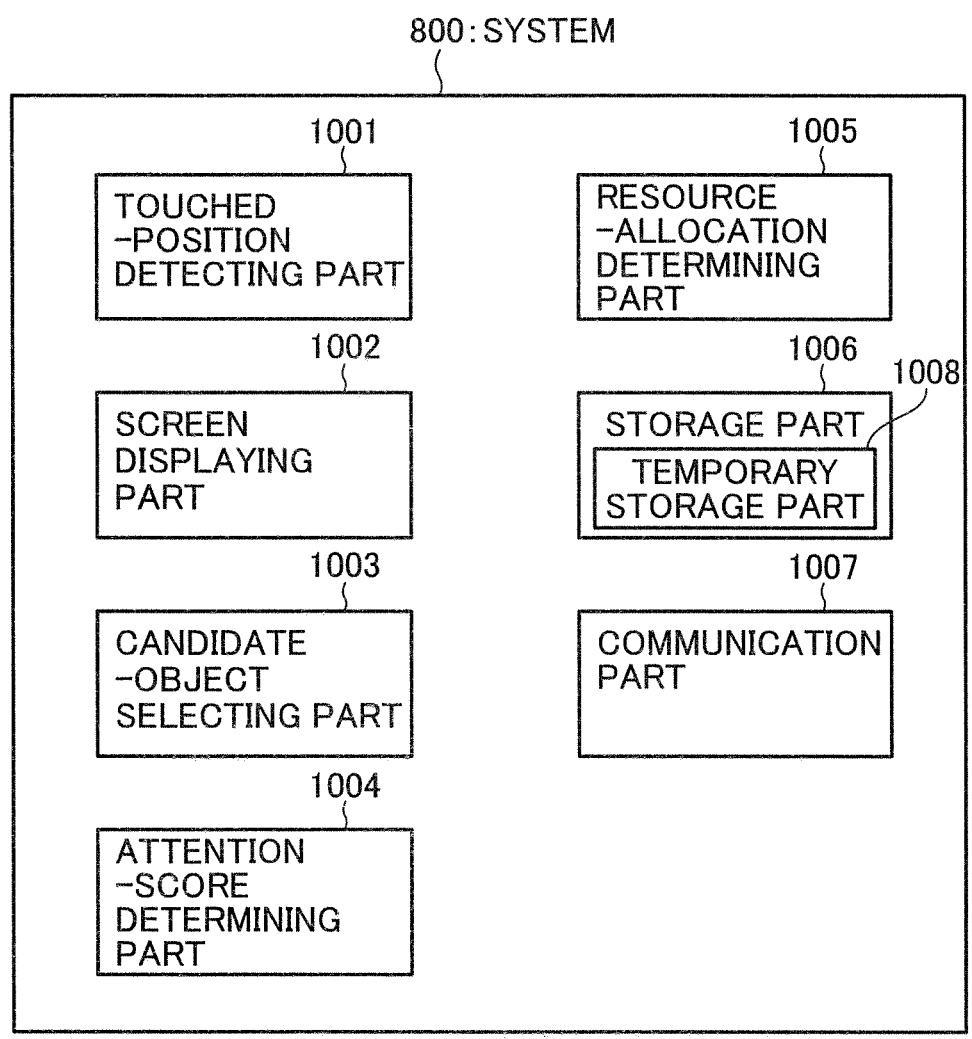
FIG. 10 shows a functional block diagram of a system according to one embodiment of the present invention.

FIG. 10 shows an example of the functional block diagram of a system according to the present invention. The functions shown in FIG. 10 are equivalent to the functions shown in FIG. 3. The various functions of the system 800 shown in FIG. 10 can be realized by providing the electronic device 100 and/or the server 900 with the various functions shown in FIG. 10. The following embodiment will be described in the context of the case where the electronic device 100 or the server 900 includes the database 107 or the database 907; however, as described earlier, the system 800 may include the database 802 connected to the network, separately from the electronic device 100 or the server 900. In this case, the electronic device 100 or the server 900 can obtain data from the database 802.

As a system according to one embodiment, the electronic device 100 includes a touched-position detecting part 1001, a screen displaying part 1002, a candidate-object selecting part 1003, a resource-allocation determining part 1005, a storage part 1006, a communication part 1007, and a temporary storage part 1008, and the server 900 includes the attention-score determining part 304, the storage part 1006, and the communication part 1007. In this embodiment, the use of the database 907 is assumed, and the databases 107 and 802 should preferably be omitted from the configuration. For example, the system 800 can execute the information processing shown in the flowchart in FIG. 5, and in this case, the electronic device 100 executes the steps other than steps 503 and 504, and the server 900 executes steps 503 and 504. The server 900 sends the attention scores determined in steps 503 and 504 to the electronic device 100, and the electronic device 100 can continuously execute the processing in and after step 505 by receiving the attention scores.

Here, the event history information is accumulated in the buffer of the electronic device 100 by the temporary storage part 1008, and the electronic device 100 sends the accumulated data to the server 900 by the communication part 1007, preferably regularly, and the storage part 1006 stores the received data in the event-history-information database of the database 907. Furthermore, the storage part 1006 can aggregate the frequencies of occurrence of individual patterns of event sequences constituted of two or more consecutive events from the event history information and store event frequency information representing the frequencies of occurrence in the event-frequency-information database of the database 907.

As a system according to another embodiment, the electronic device 100 does not include the database 107 and has the functions other than the function of the database in the storage part 1006, and the server 900 includes the database 907 and has the functions of the storage part 1006 and the communication part 1007. For example, the system 800 can execute the information processing shown in the flowchart in FIG. 5, and in this case, the electronic device 100 executes all the steps. However, in step 504, the database 907 is queried for event history information and/or event frequency information to obtain desired data for determining attention scores. The event history information is accumulated in the buffer of the electronic device 100 by the temporary storage part 1008. The electronic device 100 sends the accumulated data to the server 900 by the communication part 1007, preferably regularly, and the storage part 1006 stores the received data in the event-history-information database of the database 907.

Figure 11:
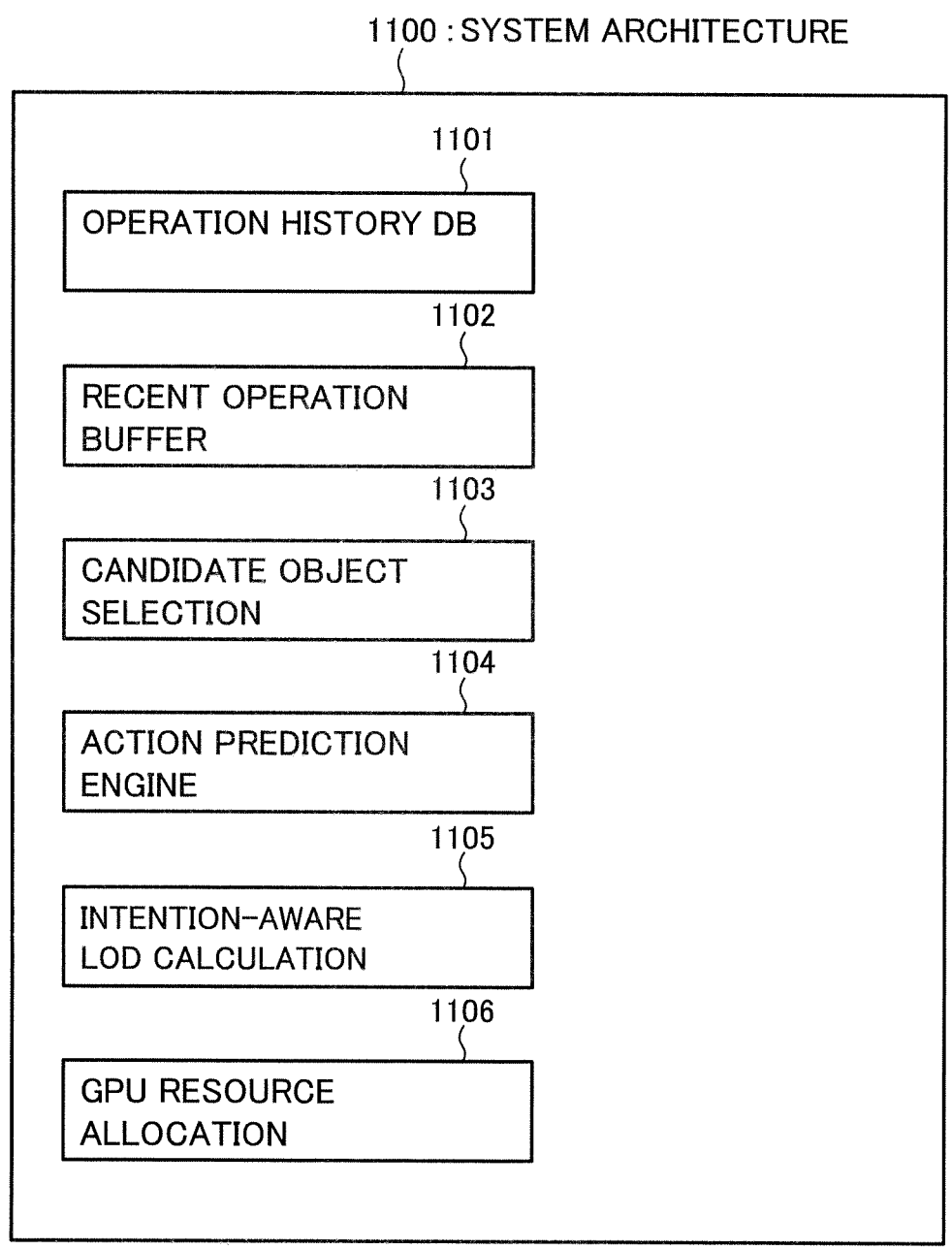
FIG. 11 shows the system architecture of a system according to one embodiment of the present invention.

As described above, the system according to an embodiment of the present invention can be implemented either by a single electronic device or a system in which a plurality of electronic devices are connected via a network. The system has the functions shown in FIG. 10, and a system architecture 1100 according to one embodiment can be constituted of six modules shown in FIG. 11. This modularization enables application to various kinds of game by modifying some of the modules.

An operation-frequency database 1101 is a database that stores frequency information of operations that were executed consecutively or frequency information of events that occurred consecutively. The operation-frequency database 1101 corresponds to the database 907, etc. and has a function corresponding to a part of the storage part 1006.

A recent operation (event) buffer 1102 is a buffer that records a history of immediately preceding (N−1) operations or events of the player. This module corresponds to the buffer included in the storage unit and has a function corresponding to a part of the storage part 1008 or the temporary storage part 1011 described earlier.

A candidate object selection 1103 is a module that selects objects that serve as the targets of LOD control in accordance with the degrees of attention on the screen. This module selects, as candidates, characters operated by the player or enemy characters relevant to the game, not trees constituting parts of the background or characters irrelevant to the game, and has a function corresponding to the candidate-object selecting part 1003. When implementing these 3D objects in the game, it is desired that the game developer add tags to the objects that serve as the targets of the LOD control according to the present invention.

An action prediction engine 1104 is a software module that predicts the next action of the player and has a function corresponding to a part of the attention-score determining part 1004. An intention-aware LOD calculation 1105 calculates the index value expressed in equation (2) and has a function corresponding to a part of the attention-score determining part 1004.

A GPU resource allocation (primitive reduction) 1106 dynamically reduces primitives in the relevant buffer by using a geometry shader and has a function corresponding to the resource-allocation determining part 1005. In one embodiment of the present invention, it is presupposed that a 3D model having the highest definition is stored in the buffer. That is, processing for applying the intention-aware LOD according to the present invention is implemented as processing for reducing primitives from a 3D model in a buffer.

In the processing or operation described above, the processing or operation can be modified freely as long as no inconsistency occurs in the processing or operation, such as an inconsistency that a certain step involves the use of data that could not yet be available in that step. Furthermore, the Examples described above are examples for explaining the present invention, and the present invention is not limited to those Examples. The present invention can be embodied in various forms as long as those forms do not depart from the gist thereof.

REFERENCE SIGNS LIST

100 Electronic device
101, 901 Processing unit
102, 902 Display unit
103, 903 Input unit
104, 904 Storage unit
105, 905 Communication unit
106, 906 Programs
107, 907 Database
108, 908 Bus 109 CPU
110 GPU
111 Main memory
112 Video memory
113 Touchscreen
301, 1001 Touched-position detecting part
302, 1002 Screen displaying part
303, 1003 Candidate-object selecting part
304, 1004 Attention-score determining part
305, 1005 Resource-allocation determining part
306, 1006 Storage part
307, 1007 Communication part
308, 1008 Temporary storage part
401 Vertex shader
402 Geometry shader
403 Rasterizer
404 Pixel shader
405 Output combination
800 System
801 Network
802 Database
900 Server
1100 System architecture
1101 Operation history DB
1102 Recent operation buffer
1103 Candidate object selection
1104 Action prediction engine
1105 Intention-Aware LOD calculation
1106 GPU resource allocation

The invention claimed is:

1. A non-transitory computer readable medium storing a program that is executed on an electronic device including a display and a processor in order to determine resource allocation in the processor for rendering a plurality of three-dimensional objects disposed in a three-dimensional virtual space, the program causing the electronic device to:
select a plurality of candidate objects related to game events from among a plurality of objects that are rendered on the display;
determine attention scores representing the degrees of attention that are paid by a player to the plurality of candidate objects by determining weights relating to an occurrence of individual candidate events, which are events related to the plurality of candidate objects, on the basis of the plurality of candidate objects, an event or a sequence of events that occurred immediately before, and event history information including information about the events that occurred,
wherein the event history information comprises event frequency information representing the frequencies of occurrence of individual patterns of event sequences constituted of two or more consecutive events in a history of the events that occurred,
wherein the event frequency information comprises information representing the frequencies of occurrence of individual patterns of event sequences constituted of not more than N (N ≥2) consecutive events,
wherein determining the attention scores comprises calculating scores representing possibilities of the individual candidate events occurring next, based on, for each of the candidate events, the frequency of occurrence of a sequence of n (2≤n ≤N) consecutive events in the event frequency information, the sequence of n consecutive events being constituted of an event or a sequence of events that occurred immediately before the candidate event and the candidate event; and
determine resource allocation in the processor for rendering individual candidate objects on the basis of the attention scores and depth distances of the individual candidate objects as viewed from the player.

2. The non-transitory computer readable medium according to claim 1, wherein calculating the attention scores includes:
calculating scores for each of the candidate events with individual values of n =n1 to n2 (2≤n1<n2≤N), multiplying the calculated scores by predetermined coefficients corresponding to the magnitudes of the values of n, and adding the results together.

3. The non-transitory computer readable medium according to claim 1,
wherein the program further causes the electronic device to
store events that occurred.

4. The non-transitory computer readable medium according to claim 1,
wherein the electronic device is connected to a server via a network, and
wherein the program further causes the electronic device to:
receive the event history information from the server; and
send information including events that occurred to the server in order to store the events that occurred at the server.

5. The non-transitory computer readable medium according to claim 1, wherein the processor includes a plurality of shader, and the resource allocation in the processor includes allocation of the shader used to render the individual candidate objects.

6. An electronic device comprising:
a display; and
a processor,
wherein the electronic device is configured to select a plurality of candidate objects related to game events from among a plurality of three-dimensional objects disposed in a three-dimensional virtual space rendered on the display;
wherein the electronic device is configured to determine attention scores representing the degrees of attention that are paid by a player to the plurality of candidate objects by determining weights relating to an occurrence of individual candidate events, which are events related to the plurality of candidate objects, on the basis of the plurality of candidate objects, an event or a sequence of events that occurred immediately before, and event history information including information about events that occurred,
wherein the event history information comprises event frequency information representing the frequencies of occurrence of individual patterns of event sequences constituted of two or more consecutive events in a history of events that occurred,
wherein the event frequency information comprises information representing the frequencies of occurrence of individual patterns of event sequences constituted of not more than N (N ≥2) consecutive events,
wherein determining the attention scores comprises calculating scores representing possibilities of the individual candidate events occurring next, based on, for each of the candidate events, the frequency of occurrence of a sequence of n (2≤n ≤N) consecutive events in the event frequency information, the sequence of n consecutive events being constituted of an event or a sequence of events that occurred immediately before the candidate event and the candidate event, and wherein the electronic device is configured to determine resource allocation in the processor for rendering individual candidate objects on the basis of the attention scores and depth distances of the individual candidate objects as viewed from the player.

7. A system comprising:

a server; and an electronic device coupled to the server via a network, wherein the electronic device comprises a display and a processor, wherein the electronic device is configured to select a plurality of candidate objects related to game events from among a plurality of three-dimensional objects disposed in a three-dimensional virtual space rendered on the display, wherein the electronic device is configured to determine attention scores representing the degrees of attention that are paid by a player to the plurality of candidate objects by determining weights relating to an occurrence of individual candidate events, which are events related to the plurality of candidate objects, on the basis of the plurality of candidate objects, an event or a sequence of events that occurred immediately before, and event history information including information about events that occurred, wherein the event history information comprises event frequency information representing the frequencies of occurrence of individual patterns of event sequences constituted of two or more consecutive events in a history of events that occurred, wherein the event frequency information comprises information representing the frequencies of occurrence of individual patterns of event sequences constituted of not more than N (N ≥2) consecutive events, wherein determining the attention scores comprises calculating scores representing possibilities of the individual candidate events occurring next, based on, for each of the candidate events, the frequency of occurrence of a sequence of n (2≤n ≤N) consecutive events in the event frequency information, the sequence of n consecutive events being constituted of an event or a sequence of events that occurred immediately before the candidate event and the candidate event, and wherein the electronic device is configured to determine resource allocation in the processor for rendering individual candidate objects on the basis of the attention scores and depth distances of the individual candidate objects as viewed from the player.

8. A system according to claim 7, wherein the server or the electronic device in the system further comprises a storage configured to store events that occurred, and wherein the storage:

creates event history information including event frequency information representing the frequencies of occurrence of individual patterns of event sequences constituted of two or more consecutive events in a history of the events stored in the storage.

9. A method of determining, in a system including a server and an electronic device that is connected to the server via a network and that includes a display and a processor, resource allocation in the processor for rendering a plurality of three-dimensional objects disposed in a three-dimensional virtual space, the method comprising:

selecting a plurality of candidate objects related to game events from among a plurality of objects that are rendered on the display;

determining attention scores representing the degrees of attention that are paid by a player to the plurality of candidate objects by determining weights relating to an occurrence of individual candidate events, which are events related to the plurality of candidate objects, on the basis of the plurality of candidate objects, an event or a sequence of events that occurred immediately before, and event history information including information about events that occurred, wherein the event history information comprises event frequency information representing the frequencies of occurrence of individual patterns of event sequences constituted of two or more consecutive events in a history of events that occurred, wherein the event frequency information comprises information representing the frequencies of occurrence of individual patterns of event sequences constituted of not more than N (N ≥2) consecutive events, wherein determining the attention scores comprises calculating scores representing possibilities of the individual candidate events occurring next, based on, for each of the candidate events, the frequency of occurrence of a sequence of n (2≤n ≤N) consecutive events in the event frequency information, the sequence of n consecutive events being constituted of an event or a sequence of events that occurred immediately before the candidate event and the candidate event, and determining resource allocation in the processor for rendering individual candidate objects on the basis of the attention scores and depth distances of the individual candidate objects as viewed from the player.

* * * * *